(12) United States Patent
Hallack et al.

(10) Patent No.: US 12,298,001 B2
(45) Date of Patent: May 13, 2025

(54) ILLUMINATION ASSEMBLY INCLUDING A MICROLENS ARRAY

(71) Applicant: Gentex Corporation, Zeeland, MI (US)

(72) Inventors: Jason D. Hallack, Zeeland, MI (US); Danny L Minikey, Jr., Fenwick, MI (US); Eric P. Bigoness, Ada, MI (US)

(73) Assignees: GENTEX CORPORATION, Zeeland, MI (US); MAYO FOUNDATION FOR MEDICAL EDUCATION AND RESEARCH, Rochester, MN (US)

( * ) Notice: Subject to any disclaimer, the term of this patent is extended or adjusted under 35 U.S.C. 154(b) by 0 days.

(21) Appl. No.: 18/519,461

(22) Filed: Nov. 27, 2023

(65) Prior Publication Data

US 2024/0175565 A1 May 30, 2024

Related U.S. Application Data (60) Provisional application No. 63/428,175, filed on Nov. 28, 2022.

(51) Int. Cl.
| | |
|---|---|
| *F21V 5/00* | (2018.01) |
| *F21K 9/233* | (2016.01) |
| *F21V 21/03* | (2006.01) |
| *F21V 21/26* | (2006.01) |
| *G06F 3/01* | (2006.01) |
| *F21W 131/20* | (2006.01) |

(Continued)

(52) U.S. Cl.
CPC .............. *F21V 5/007* (2013.01); *F21K 9/233* (2016.08); *F21V 5/004* (2013.01); *F21V 21/03* (2013.01); *F21V 21/26* (2013.01); *G06F 3/011* (2013.01); *F21W 2131/20* (2013.01); *F21Y 2105/18* (2016.08); *F21Y 2115/10* (2016.08)

(58) Field of Classification Search
CPC ...... F21V 5/007; F21K 9/233; F21Y 2105/18; F21Y 2115/10; F21Y 2105/10
See application file for complete search history.

(56) References Cited

U.S. PATENT DOCUMENTS

| | | |
|---|---|---|
| 6,796,690 B2 | 9/2004 | Bohlander |
| 9,169,017 B2 | 10/2015 | Palagashvili et al. |

(Continued)

FOREIGN PATENT DOCUMENTS

| | | |
|---|---|---|
| CN | 109654406 A | 4/2019 |
| KR | 102411503 A | 6/2022 |

*Primary Examiner* — Evan P Dzierzynski
(74) *Attorney, Agent, or Firm* — Price Heneveld LLP; Brian James Brewer (57) ABSTRACT

An illumination system includes an array of LEDs including a plurality of first LEDs and a plurality of second LEDs. A microlens array overlays the plurality of LEDs and includes a plurality of first lenses corresponding to the plurality of first LEDs and a plurality of second lenses corresponding to the plurality of second LEDs. A first geometry of at least one of the plurality of first lenses is different than a second geometry of at least one of the plurality of second lenses. An imaging device is configured to capture an image based on light reflected from the array of LEDs. At least one processing device is in communication with the array of LEDs and the imaging device. The at least one processing device is configured to identify a shadow cast on the target region by an obstruction and selectively activate the array of LEDs based on the shadow.

18 Claims, 5 Drawing Sheets

(51) Int. Cl.
    *F21Y 105/18*    (2016.01)
    *F21Y 115/10*    (2016.01)

(56) References Cited

U.S. PATENT DOCUMENTS

| | | |
|---|---|---|
| 11,054,108 B2 | 7/2021 | Van Gheluwe et al. |
| 2014/0084809 A1* | 3/2014 | Catalano ................ H05B 45/10 |
| | | 315/295 |
| 2014/0254153 A1* | 9/2014 | Vissenberg ........... F21V 7/0016 |
| | | 362/235 |
| 2015/0055323 A1* | 2/2015 | Schreiber ................ F21V 21/30 |
| | | 362/96 |
| 2019/0249847 A1* | 8/2019 | Hallack .................. A61B 90/30 |
| 2020/0107422 A1* | 4/2020 | McReynolds ........ H05B 47/195 |
| 2022/0037856 A1* | 2/2022 | Ghosh .................. G02B 3/0006 |
| 2022/0086988 A1 | 3/2022 | Coleman |
| 2022/0099985 A1* | 3/2022 | Li ....................... G02B 27/0922 |
| 2022/0214030 A1* | 7/2022 | Xu ....................... F21V 21/0832 |

* cited by examiner

ILLUMINATION ASSEMBLY INCLUDING A MICROLENS ARRAY

CROSS-REFERENCE TO RELATED APPLICATION

This application claims priority to and the benefit under 35 U.S.C. § 119(e) of U.S. Provisional Application No. 63/428,175, filed on Nov. 28, 2022, entitled "ILLUMINATION ASSEMBLY INCLUDING A MICROLENS ARRAY," the disclosure of which is hereby incorporated herein by reference in its entirety.

TECHNOLOGICAL FIELD

The present disclosure generally relates to an illumination assembly having a microlens array and, more particularly, to a surgical luminaire incorporating LEDs with a microlens array.

SUMMARY OF THE DISCLOSURE

According to one aspect of the present disclosure, an illumination system includes an array of light-emitting diodes (LEDs) including a plurality of first light-emitting diodes and a plurality of second light-emitting diodes. A microlens array overlays the plurality of first and second light-emitting diodes and includes a plurality of first lenses corresponding to the plurality of first light-emitting diodes and a plurality of second lenses corresponding to the plurality of second light-emitting diodes. A first geometry of at least one of the plurality of first lenses is different than a second geometry of at least one of the plurality of second lenses. An imaging device is configured to capture an image based on light reflected from a target region from the plurality of first light-emitting diodes. At least one processing device is in communication with the array of light-emitting diodes and the imaging device. The at least one processing device is configured to identify a shadow cast on the target region by an obstruction and selectively activate the plurality of second light-emitting diodes from an unobstructed angle.

According to another aspect of the present disclosure, an illumination system includes an array of light-emitting diodes (LEDs) including a plurality of first light-emitting diodes and a plurality of second light-emitting diodes. A microlens array overlays the plurality of first and second light-emitting diodes and includes a plurality of first lenses corresponding to the plurality of first light-emitting diodes and a plurality of second lenses corresponding to the plurality of second light-emitting diodes. A first geometry of the plurality of first lenses corresponds to a first illumination angle a second geometry of the plurality of second lenses corresponds to a second illumination angle that is different than the first illumination angle. A control system is in communication with the array of light-emitting diodes and configured to selectively activate the plurality of second light-emitting diodes and the plurality of second light-emitting diodes to illuminate a target region from an unobstructed angle.

According to yet another aspect of the present disclosure, an illumination system includes an array of light-emitting diodes (LEDs) including a plurality of first light-emitting diodes and a plurality of second light-emitting diodes. A microlens array overlays the plurality of first and second light-emitting diodes and includes a plurality of first lenses corresponding to the plurality of first light-emitting diodes and a plurality of second lenses corresponding to the plurality of second light-emitting diodes. A first geometry of the plurality of first lenses corresponds to a first illumination angle a second geometry of the plurality of second lenses corresponds to a second illumination angle that is different than the first illumination angle. A control system is configured to selectively activate the array of light-emitting diodes to obtain at least one of the first illumination angle or the second illumination angle while the array of light-emitting diodes and the microlens array are statically positioned.

These and other features, advantages, and objects of the present device will be further understood and appreciated by those skilled in the art upon studying the following specification, claims, and appended drawings.

The components in the figures are not necessarily to scale, emphasis instead being placed upon illustrating the principles described herein.

DETAILED DESCRIPTION OF EMBODIMENTS

The present illustrated embodiments reside primarily in a combination of apparatus components related to an illumination assembly that includes a microlens array. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

Figure 1:
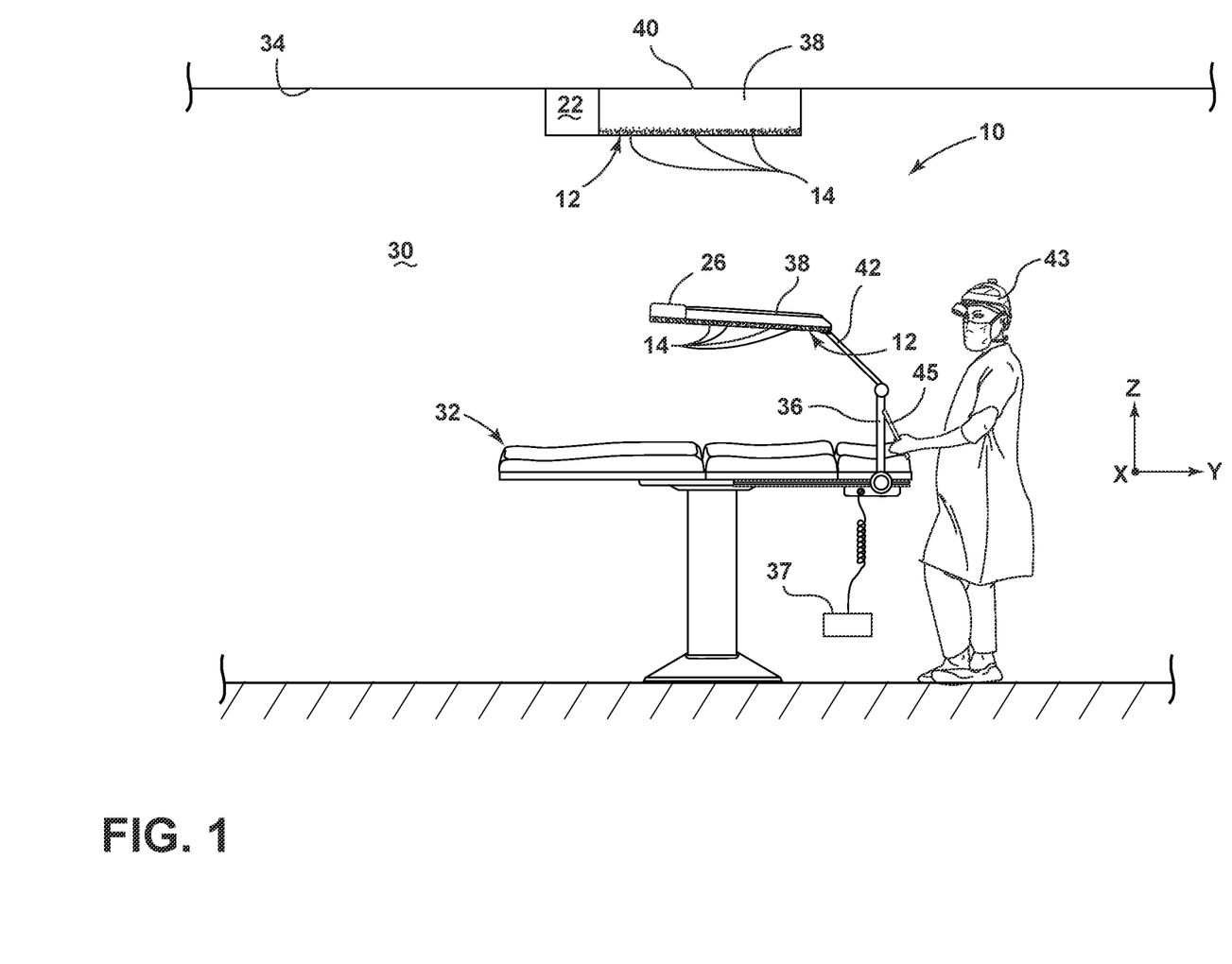
FIG. 1 is a side elevational view of an exemplary medical environment incorporating an illumination system of the present disclosure.

For purposes of description herein, the terms "upper," "lower," "right," "left," "rear," "front," "vertical," "horizontal," and derivatives thereof shall relate to the illumination assembly as oriented in FIG. 1. Unless stated otherwise, the term "front" shall refer to the surface of the element closer to a target region of the illumination assembly, and the term "rear" shall refer to the surface of the element further from the target region of the illumination assembly. However, it is to be understood that the illumination assembly may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

Figure 2:
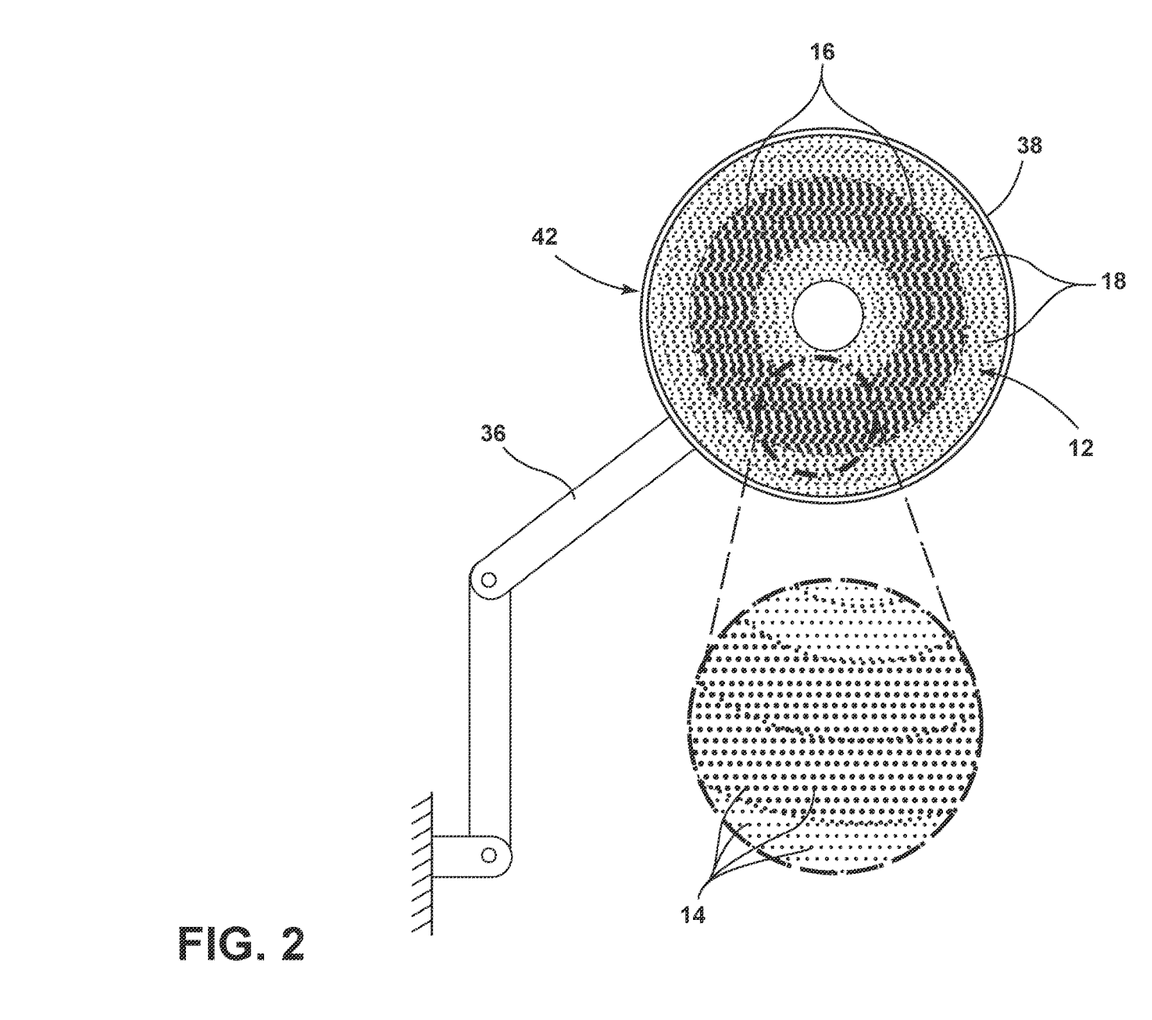
FIG. 2 is a front plan view based on FIG. 1 of an illumination assembly according to one aspect of the present disclosure.

Referring to FIGS. 1-5, an illumination system 10 includes an array 12 of light-emitting diodes (LEDs) 14 including a plurality of first LEDs 16 and a plurality of second LEDs 18 (FIG. 2). A microlens array 20 overlays the plurality of first and second LEDs 16, 18 and includes a plurality of first lenses corresponding to the plurality of first LEDs 16 and a plurality of second lenses corresponding to the plurality of second LEDs 18 (FIGS. 4A-4D). A first geometry (e.g., focal point) of at least one of the plurality of first lenses is different than a second geometry (e.g., focal point) of at least one of the plurality of second lenses. An imaging device 22 is configured to capture an image including light reflected from a target region by illumination from the plurality of first LEDs 16. A control system includes at least one processing device 24, 26 (FIG. 5) that is in communication with the array 12 of LEDs 14 and the imaging device 22. The at least one processing device 24, 26 is configured to identify a shadow 28 obstructing the target region and selectively activate the plurality of second LEDs 18 from an unobstructed angle.

Referring now more particularly to FIG. 1, the present illumination system 10 may be employed in a medical environment 30, such as a surgical operation room. The medical environment 30 may include an operating table 32 for supporting a patient thereon, and may further include one or more structures 34, 36 incorporating at least one luminaire 38 for illuminating the medical environment 30. The one or more structures 34, 36 may include a ceiling 34 of the medical environment 30, another wall of the medical environment 30, and/or a mobile boom 36. The mobile boom 36 may be coupled with the operating table 32, spaced from the operating table 32, and/or may incorporate a base with rolling elements that facilitate movement of the luminaire 38 about the medical environment 30. As exemplarily shown, the lighting system 10 of the present disclosure is incorporated into both a ceiling light fixture 40 and a light fixture 42 of the boom 36. It is contemplated that the enhancements provided by the present illumination system 10 may be achieved via either incorporation into the boom 36 and/or the ceiling 34, though different lighting patterns may be achieved depending on the particular implementation, as will be further described herein. In some embodiments, the control system (e.g., the least one processing device 24, 26) may be paired to a user interface 37 that includes a plurality of inputs for manually performing the functions and steps described herein.

With continued reference to FIG. 1, the imaging device 22 may include one or more imaging devices 22 that may be disposed on or in the one or more structures 34, 36 and/or the luminaire 38 for monitoring the medical environment 30. For example, one or more of the imaging devices 22 may be communicatively coupled to and/or disposed in the luminaire 38, the boom 36, and/or other locations in the medical environment 30. In some embodiments, one of the imaging devices 22 may be located on a wearable structure, such as a headband 43 shown in FIG. 1. In some embodiments, the array 12 may be located on a wearable structure with the imaging device 22 in the same or a different structure. In some embodiments, a wand 45 may be utilized for directing the illumination. More particularly, a wand 45, such as that illustrated in FIG. 1, may control the lighting modes with HMI inputs (e.g., buttons), pointing, orienting, moving, projecting a pattern of light recognizable to the control system (e.g., the least one processing device 24, 26) on the target surface, and/or combinations thereof. The wand 45 may be in wired or wireless connection to the control system (e.g., the least one processing device 24, 26) and/or otherwise recognizable in images captured by the imaging device 22.

Figure 5:
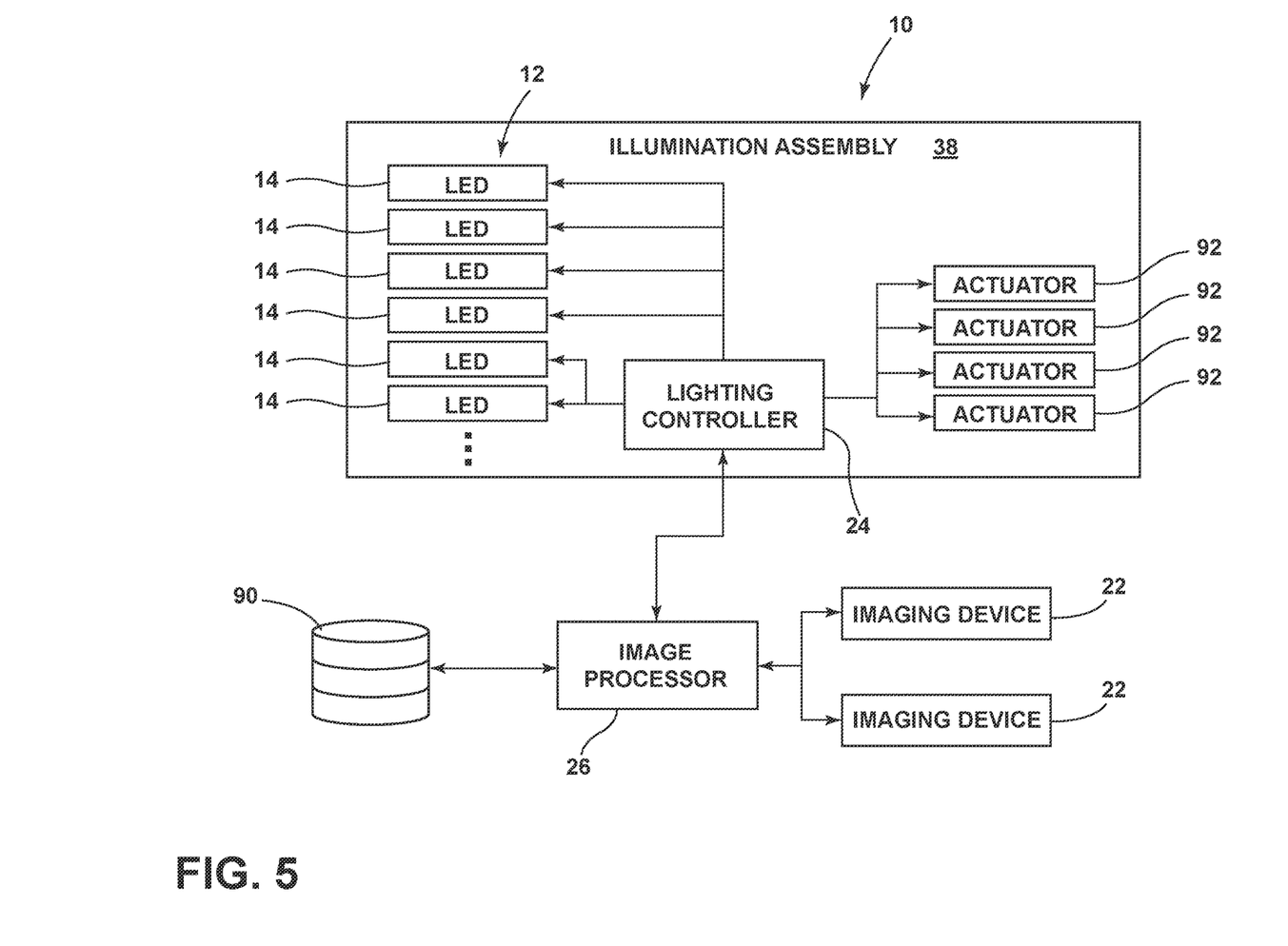
FIG. 5 is a block diagram of an illumination system according to one aspect of the present disclosure.

As best shown in FIG. 5, each of the imaging devices 22 (e.g., camera, imager, and/or video capturing device) may be configured to capture images of a medical professional and/or a target region in the medical environment 30. The images may then be processed by the at least one processing device 24, 26. The array 12 of LEDs 14 may then be controlled based on the captured images in order to enhance the lighting conditions in the medical environment 30. It should be appreciated that while the illumination system 10 is shown in the medical environment 30, the illumination system 10 may be used in any environment where dynamic lighting of a target region is beneficial.

Referring now to FIG. 2, the luminaire 38 is exemplarily shown incorporated with the boom 36 previously described with respect to FIG. 1. The array 12 of LEDs 14 may be densely arranged to provide enhanced light output and allow for control of the particular light pattern projected from the illumination assembly 38. For example, the array 12 of LEDs 14 may be arranged in a hexagonal pattern, a square pattern, a linear offset pattern (as illustrated), in rows and/or columns, one or more concentric circles, or any other geometric shape that allows the LEDs 14 to be positioned close to one another. For example, the distribution of the array 12 of LEDs 14 may allow for spacing of between about 1 mm and 5 mm or less between adjacent LEDs. In some examples, the spacing between any two adjacent LEDs 14 of the array 12 of LEDs 14 may be less than 1 mm (e.g., 0.1 mm to 0.9 mm). Overlaying the array 12 of LEDs 14 is the microlens array 20, which may be substantially transparent and is further described below in reference to FIGS. 3-4D. The microlens array 20 is in optical communication with the array 12 of LEDs 14 to guide the light emitted from the LEDs 14 in a particular way determined by the geometry of the microlens array 20.

Figure 3:
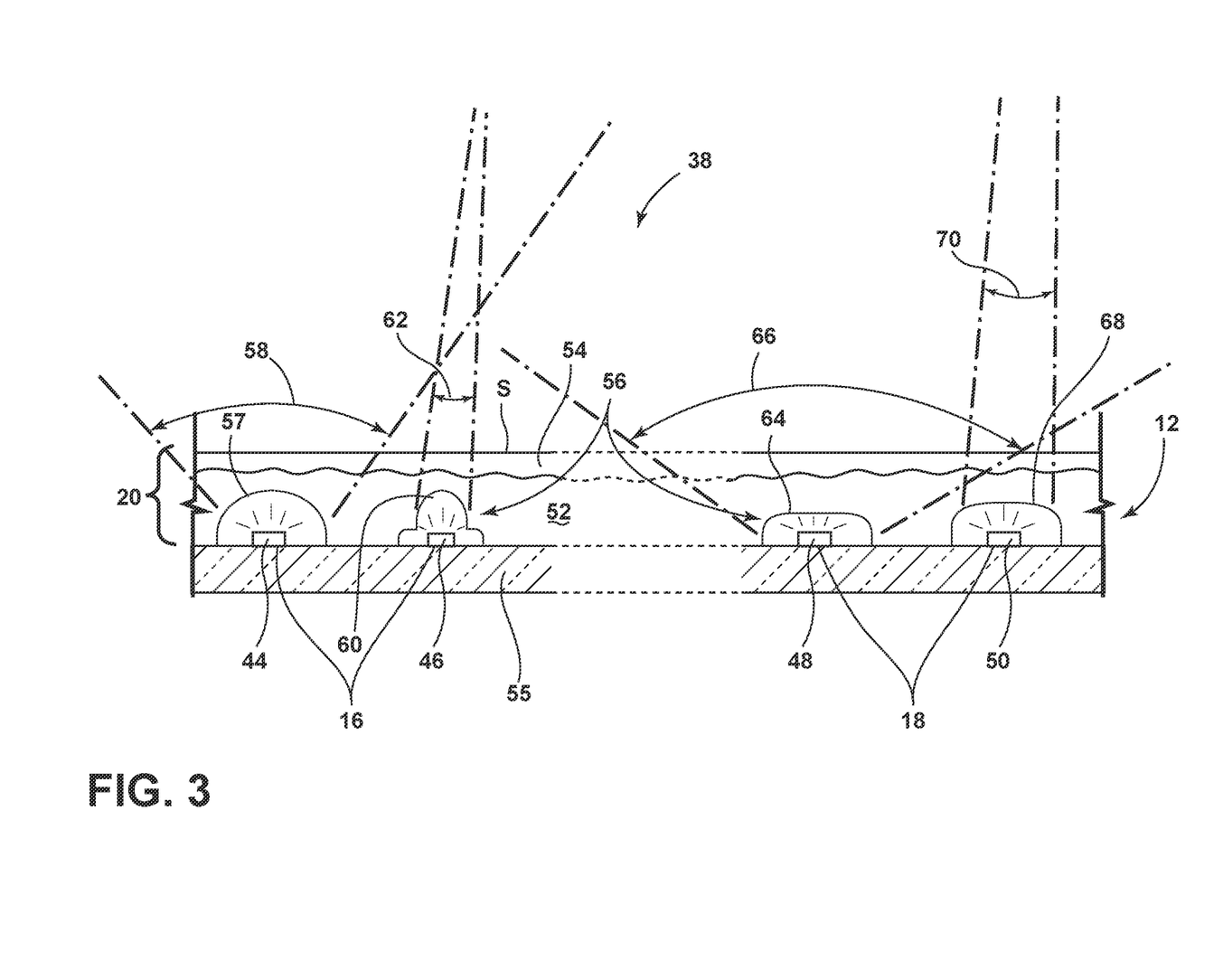
FIG. 3 is a partial cross-sectional view of a section of an illumination assembly according to one aspect of the present disclosure.

Referring now to FIG. 3, a region of the array 12 of LEDs 14 may have a set of four emitters 44, 46, 48, 50 (i.e., individual LEDs) that include a first emitter 44, a second emitter 46, a third emitter 48, and a fourth emitter 50. As illustrated, the microlens array 20 may include an inner layer 52 and an outer layer 54 overlaying the array 12 of LEDs 14

(e.g., emitters 44, 46, 48, 50). The outer layer 54 may be applied to the inner layer 52 to provide a smooth texture for an outer surface "S" of the microlens array 20, while the inner layer 52 may form the various lens structures/shapes for some or all of the individual LEDs 14 (e.g., the emitters 44, 46, 48, 50). In some examples, the outer layer 54 is omitted and the outer surface S is formed by the inner layer 52. The outer surface S may be flat, smooth, convex, concave, and/or other topographies. In the present example, the portion of the microlens array 20 that forms the geometries of the plurality of lenses defines a singular, integrally-formed body that extends across at least some (e.g., two or more or each) of the plurality of the emitters 44, 46, 48, 50 of the array 12.

Still referring to FIG. 3, the array 12 of emitters 44, 46, 48, 50 may be disposed on a common substrate 55, such as a printed circuit board, that includes electronics configured to control electrical properties of the emitters 44, 46, 48, 50. The common substrate 55 may be planar, convex, concave, or other shapes to optimally distribute the array 12 of LEDs 14. For example, the substrate 55 may include electrode tracings between an anode and a cathode of each emitter 44, 46, 48, 50 that are communicatively coupled to a lighting controller 24, as will be further described in relation to FIG. 5. As depicted, the inner substantially transparent layer 52 of the microlens array 20 may define a plurality of lenses 56 having different geometries. By way of example, four different geometries of the plurality of lenses 56 are illustrated. For example, the plurality of lenses 56 may include a first lens 57 disposed over the first emitter 44 that defines a first geometry configured to distribute light emitted from the first emitter 44 in a first distribution 58. Because the first geometry may include a relatively broad radius of curvature, the first distribution 58 may have a divergence angle of approximately 30° to 45° from a central axis through the first lens 57. The plurality of lenses may include a second lens 60 disposed over the second emitter 46 that defines a second geometry configured to distribute light emitted from the second emitter 46 in a second distribution 62. The second distribution 62 may be significantly narrower than the first distribution 58. For example, the second geometry of the second lens 60 may result in a concentrating of the light emitted from the second emitter 46 to a particular focal point. In this way, the light emitted from the second emitter 46 may result in a first converging light pattern, whereas the light emitted from the first emitter 44 may result in a first diverging light pattern.

Still referring to FIG. 3, the plurality of lenses 56 may include a third lens 64 disposed over the third emitter 48 that defines a third geometry configured to produce a third distribution 66 (e.g., a second diverging light pattern) of light at a broad divergence angle that is greater than the divergence angle of the first lens 57. For example, the shallow height and broad elongated geometry of the third lens 64 relative to the third emitter 48 may allow for a divergence angle in the range of 40°-60° from a central axis through the third lens 64. The plurality of lenses 56 may further include a fourth lens 68 disposed over the fourth emitter 50 and configured to concentrate the light emitted from the fourth emitter 50 into a fourth distribution 70. The fourth distribution may have a second converging light pattern with a greater focal distance (e.g., a smaller magnitude of convergence) than the first converging light pattern. For example, the geometry of the fourth lens 68 (e.g., a relatively large and relatively flat upper surface of the lens 68) may guide the second light beam to have a focal distance of, for example, several feet.

The difference in the second and fourth lenses 60, 68 may allow for different operational principles depending on the location of the illumination assembly 38 with respect to the target region in the medical environment 30. For example, the second emitter 46 may be selectively activated more frequently than the fourth emitter 50 when the illumination system 10 is incorporated into the boom 36 due to the proximity of the illumination system 10 to the operating table 32 or other target region. Similarly, when the illumination system 10 is incorporated into, for example, the ceiling light fixture 40, the fourth emitter 50 may be selectively activated more regularly for targeted lighting techniques. In this way, the lighting system 10 may provide for dynamic lighting arrangements for various positions or locations of the lighting system 10. In some embodiments, the focal distance of the second distribution 62 (e.g., first converging light pattern) may be at a ratio of about 1:2, about 1:3, about 1:4, or about 1:5 of the focal distance of the fourth distribution 70 (e.g., second converging light pattern).

It is contemplated that the plurality of lenses 56 described above is exemplary and non-limiting, and that any combination or arrangement of the different lenses may be incorporated along any region of the array 12 of LEDs 14. For example, an outer region of the array 12 of LEDs 14 may incorporate wide-angle diverging light patterns (e.g., employing the first and/or third emitters 44, 48), and inner portions of the luminaire 38 may incorporate the converging light patterns (e.g., employing the second and/or fourth emitters 46, 50) or vice versa. As will be described in reference to FIGS. 4A-4D, the arrangement of the microlens array 20 may be specifically implemented to allow for various operational modes from near- or far-range applications (e.g., mounted to the boom 36 or mounted to the ceiling 34), and therefore allow for a dynamic operation of the illumination system 10 in order to optimize user perception. Accordingly, the converging and diverging light patterns exemplarily demonstrated in FIG. 3 may be intermixed or regionally packed throughout some or all of the array 12 of LEDs 14.

Referring now to FIGS. 4A-4D, four operational modes are exemplarily illustrated, demonstrating the flexibility of the lighting system 10. The operational modes shown will be described in reference to the plurality of first LEDs 16 and the plurality of second LEDs 18. For example, the plurality of first LEDs 16 for a given operational mode may be activated to illuminate a first region 72, and the plurality of second LEDs 18 may be activated to illuminate a second region 74 different than the first region 72. The first and second regions 72, 74 may differ in size (e.g., area), focal distance, intensity, location, or directionality.

Figure 4A:
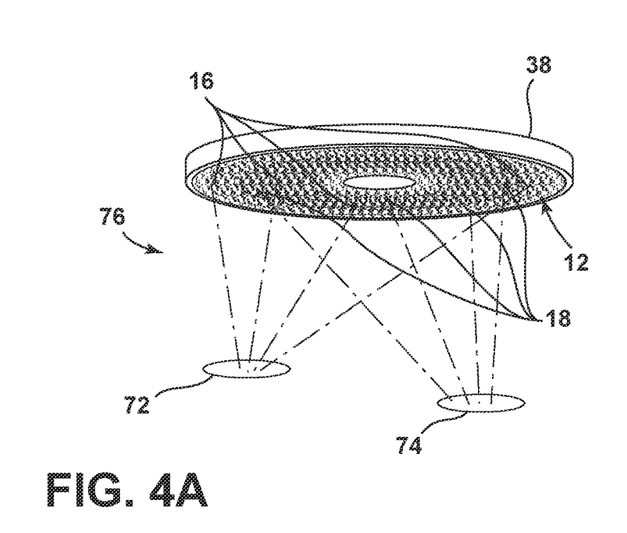
FIG. 4A is a perspective view of a first operational mode of an illumination system that illuminates a first region and a second region in a spaced apart relationship according to one aspect of the present disclosure.

Referring now more particularly to FIG. 4A, the lighting system 10 may be configured to operate the array 12 of LEDs 14 in a first operational mode 76 to change directionality of light emitted from the luminaire 38. For example, the plurality of first LEDs 16 may be activated via the lighting controller 24 (FIG. 5) to illuminate the first region 72 and the plurality of second LEDs 18 may be operated by the lighting controller 24 to illuminate the second region 74 that is spaced from the first region 72. In this example, the first and second regions 72, 74 may be misaligned with a central portion of the luminaire 38. As illustrated, the first and second regions 72, 74 may be aligned with opposing outer portions of the luminaire 38. However, it should be appreciated that the first and second regions 72, 74 in the first operational mode 76 may be further laterally spaced from one another than explicitly depicted, such that the first and second regions 72, 74 are disposed past the outer portions of the luminaire 38.

Figure 4B:
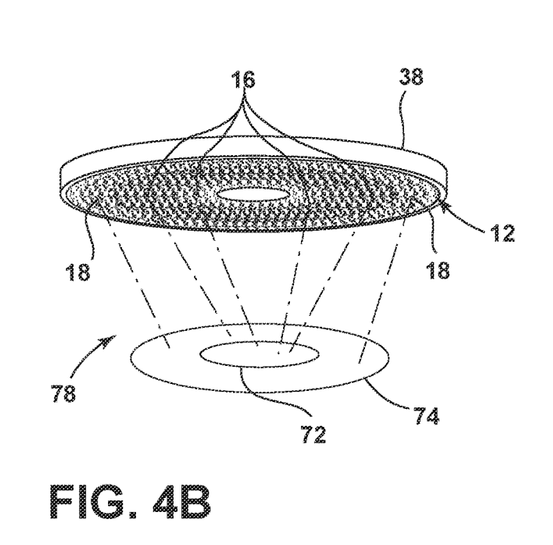
FIG. 4B is a perspective view of a second operational mode of an illumination system that illuminates a first region and a second region in an overlapping relationship according to one aspect of the present disclosure.

Referring now more particularly to FIG. 4B, a second operational mode 78 for the lighting system 10 is depicted that demonstrates employing the microlens array 20 and the array 12 of LEDs 14 to selectively overlay the regions 72, 74 by activating two or more of the converging light patterns and/or the diverging light patterns. For example, the lighting controller 24 may operate the plurality of first LEDs 16 to illuminate the first region 72 and the plurality of second LEDs 18 to illuminate the second region 74, with the second region 74 being generally aligned with the first region 72 but having a larger radius on the target region. For example, the plurality of second LEDs 18 may incorporate broader diverging light patterns (e.g., the first and/or third lenses 57, 64) that are activated by the lighting controller 24 to illuminate the second region 74, and the first region 72 may be selectively illuminated by incorporating narrower converging light patterns (e.g., the second and/or fourth lenses 60, 68) to generate the first region 72.

Figure 4C:
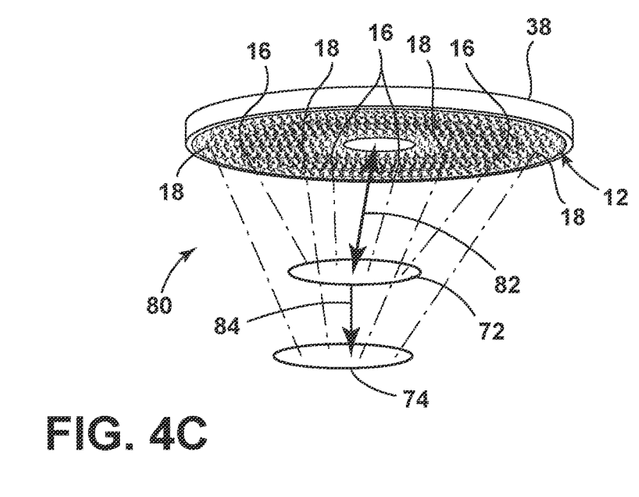
FIG. 4C is a perspective view of a third operational mode of an illumination system that illuminates a first region and a second region at different depths according to one aspect of the present disclosure.

Referring now to FIG. 4C, the lighting system 10 may operate in a third operational mode 80 in which the first region 72 corresponds to an area illuminated at a first focal distance 82 from the array 12 of LEDs 14, and the second region 74 corresponds to an area at a second focal distance 84 from the array 12 of LEDs 14. In this manner, the first focal distance 82 is less than the second focal distance 84 to allow the lighting system 10 to selectively illuminate different objects or an object having two or more surfaces at different distances from the luminaire 38. It is contemplated that the plurality of first LEDs 16 and the plurality of second LEDs 18 may be operated simultaneously and in combination with the first operational mode 76 to illuminate areas not directly under the luminaire 38. To achieve the differing focal distances, the plurality of first LEDs 16 may include one or more of the second emitters 46 previously described incorporating the first converging light pattern that defines the first focal distance (e.g., the second lens 60). Similarly, the plurality of second LEDs 18 may include one or more of the fourth emitters 50 incorporating the second converging light pattern that defines the second focal distance (e.g., the fourth lens 68).

Figure 4D:
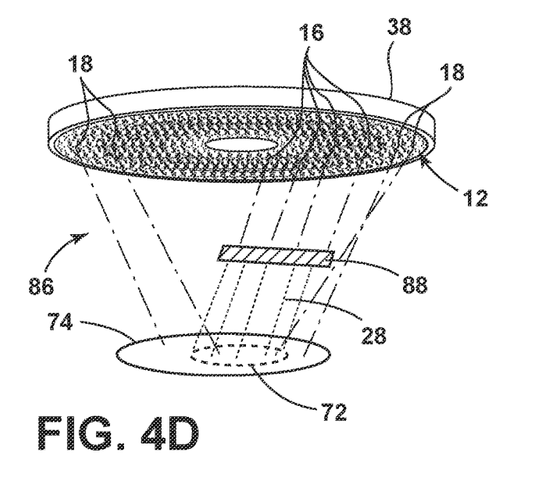
FIG. 4D is a perspective view of a fourth operational mode of an illumination system that illuminates a first region and a second region to mitigate a shadow cast on a target region according to one aspect of the present disclosure.

Referring now to FIG. 4D, a fourth operational mode 86 for the lighting system 10 may include a shadow mitigation function. In the fourth operational mode 86, when an obstruction 88 is detected between the first region 72 and the plurality of first LEDs 16, the lighting system 10 may activate the plurality of second LEDs 18 to illuminate the first region 72 from an unobstructed angle. Thus, in this example, the first and second regions 72, 74 may be substantially overlapped on the same target region. As will be described further with respect to FIG. 5, the one or more imaging devices 22 may be configured to capture an image of the image obstruction 88, process the image to detect the obstruction 88 (e.g., presence, shape, and/or location), and control the array 12 of LEDs 14 or otherwise communicate an instruction to control the array 12 of LEDs 14 in response to detection of the obstruction 88.

It is contemplated that the exemplary operational modes described with respect to FIGS. 4A-4D may be combined with one another and/or incorporate other exemplary operational modes not described in detail herein. For example, any one of the previously described operational modes may be automatically activated based on the images captured by the one or more imaging devices 22. Thus, the changing of directionality, changing of spot size, changing of focal distance, and shadow mitigation functionality may be incorporated into an algorithm executed by the lighting controller 24 and/or an image processor 26 in communication with lighting controller 24 (see FIG. 5). For example, an operation mode may incorporate one or more of the first converging light pattern, the second converging light pattern, the first diverging light pattern, and/or the second diverging light pattern associated with lenses 57, 60, 64, and 68. Moreover it should be appreciated that the microlens array 20 may incorporate any number of lenses with varying geometries to effectuate a plurality of converging light patterns (i.e., more than two) and/or diverging light patterns (i.e., more than two). In addition, it should be appreciated that the microlens array 20 may further change the angle of the light pattern such that a light pattern central axis through the converging, diverging, or otherwise non-angled shape defines an overall transmission orientation. For example, the light pattern central axes may converge at a predefined distance such that the overall transmission orientation is at least partially parabolic-shaped. In some examples, the microlens array may be configured such that the plurality of first LEDs 16 have an overall transmission orientation of convergence and the second plurality of LEDs 18 have an overall transmission orientation of divergence. In other examples, the microlens array may be configured such that the plurality of first LEDs 16 have an overall transmission orientation of divergence and the plurality of second LEDs 18 have an overall transmission orientation of convergence. In some embodiments, the plurality of first LEDs 16 are located around (e.g., concentrically) the second plurality of LEDs 18. In still further embodiments, the plurality of first LEDs 16 may have any number of combination of lenses that facilitate varying degrees of convergence, divergence, and transmission orientation. Similarly, the plurality of second LEDs 18 may have any number of combination of lenses that facilitate varying degrees of convergence, divergence, and transmission orientation. In this manner, select groupings of the first and/or second LEDs 16, 18 may be powered to achieve the various operational modes described herein in a single embodiment. Therefore, while the first and second LEDs 16, 18 are provided as an example, it should be appreciated that any number of LED groupings may be implemented to permit the various modes of operation as described herein for providing illumination at a plurality of illumination angles (e.g., convergence and divergence).

Referring now to FIG. 5, the aforementioned lighting controller 24 and image processor 26 are illustrated in communication with one another. For example, in operation, images captured via the one or more imaging devices 22 may be processed in the image processor 26 to identify body language, motions, or the like. The image processor 26 may then compare these identified features to historical image data that includes similar image data associated with executable instructions. For example, the historical data may be stored in a database or memory 90 that may be remote or local to the luminaire 38 that is configured to store target image data corresponding to various target lighting conditions. In addition, the database or memory 90 may include a dictionary of pre-saved predictive hand gesture models, shadow recognition software that includes instructions for triangulating the location of an obstruction based on the location of the obstruction, the shadow, and the imaging devices 22. The memory 90 may comprise a single disk or a plurality of disks (e.g., hard drives) and includes a storage management module that manages one or more partitions within the memory 90. In some embodiments, memory 90 may include flash memory, semiconductor (solid-state)

memory, or the like. The memory 90 may include Random Access Memory (RAM), a Read-Only Memory (ROM), Electrically Erasable Programmable Read-Only Memory (EEPROM), or a combination thereof. The memory 90 may include instructions that, when executed by at least one processing device (e.g., the lighting controller 24 and/or processor 26), cause the processing device to, at least, perform the functions associated with the components of the illumination system 10. For example, if the image captured by the one or more imaging devices 22 includes a surgeon pointing in a particular direction or toward a particular region of the operating table 32 or a patient, the image processor 26 may identify the pointing body motion from the images and compare the pointing motion to previously captured pointing motions (e.g., or other profile data) in order to determine that the luminaire 38 should direct light toward the region pointed to by the surgeon. In response to determination of the target region (e.g., the first or second regions 72, 74 previously described), the image processor 26 may communicate an instruction to the lighting controller 24 to selectively activate and/or deactivate one or more of the LEDs 14 in the LED 14 array 12 to cause the target region to be illuminated in a particular way. The lighting controller 24 may optionally be in communication with one or more actuators 92 that are configured to adjust a position of the luminaire 38 mechanically (e.g., via a mechanism connected to the boom 36, other locations in the medical environment 30, or regions of the array 12 of LEDs) to provide enhanced lighting conditions based on the images captured by the one or more imaging devices 22. The imaging devices 22 may include one or more cameras operating in one or both of the visible spectrum and infrared spectrum. In some embodiments, the imaging devices 22 (i.e., and instructions contained in the memory 90) may be configured for determining the location of features (e.g., a target region, a user, an obstruction and/or the like) in three-dimensional ("3D") space. For example, the imaging devices 22 may be configured to operate under the principles of stereovision, Time-of-Flight (ToF), LiDAR, Ultra-Wide Band (UWB), and other principles. Based on any of the foregoing principles, the control system (e.g., the least one processing device 24, 26) may be configured to extrapolating the relative locations in 3D space (e.g., between the LEDs, imaging device 22, target region, and obstruction) via triangulation to determine which lighting mode to implement to best avoid the obstruction.

It is contemplated that the above example is merely exemplary and that the lighting controller 24 may be configured to control the LEDs 14 and or the plurality of actuators 92 in response to the image processor 26 detecting body language and/or motions by a user of the illumination system 10. For example, the image processor 26 may be configured to determine a straining position or a suboptimal ergonomic position of the surgeon based on the images captured by the one or more imaging devices 22 and communicate instructions to the lighting controller 24 to control the array 12 of LEDs 14 to direct light in an optimal target direction.

In one example, such as in the operational mode depicted in FIG. 4D, the at least one processor 24, 26 is configured to determine an identity of the LEDs 14 (or region of the LEDs) that produce the shadow 28, deactivate the LEDs 14 causing the shadow 28 to limit the shadow 28, and activate other LEDs 14 to illuminate a portion of the target region blocked by the shadow 28.

In some examples, the actuators 92 are omitted from the luminaire 38 and the directional guidance is performed solely via control of the LEDs 14. Thus, in some examples, the luminaire 38 may employ no actuators 92 for adjusting the position of the luminaire 38. Stated another way, the transmission of light may be configured to be controlled while the luminaire 38 is statically positioned. It is further contemplated that, although illustrated as two separate processing devices 24, 26, the image processor 26 and the lighting controller 24 may be incorporated into a single control device, with the one or more imaging devices 22 further incorporated into the luminaire 38. Thus, the illumination system 10 of the present disclosure may be either a standalone system or may be configured for retrofitting into architecture of the medical environment 30 (e.g., an operating room) that may already include the one or more imaging devices 22 and/or the image processor 26. In this example, the luminaire 38 may include a communication module operably coupled with the lighting controller 24 that may initiate communication with a pre-installed image processor 26 in the medical environment 30 and allow for the pre-installed image processor 26 to communicate, via wired or wireless communication, to the lighting controller 24.

In general, incorporation of the microlens array 20 may provide for the dynamic options for the lighting assembly described above. In particular, the microlens array 20 may require little intervention by the user of the luminaire 38 and may allow for limited manual manipulation of the luminaire 38. Each LED 14 or regions of the array 12 of LEDs microlens array may have a unique angle, intensity, and/or color (i.e., wavelength). Additionally, or alternatively, the microlens assembly 20 may converge, diverge, and/or otherwise redirect light from individual ones of the LEDs 14 or regions of the array 12 of LEDs 14. In this way, the LEDs 14 may be individually addressable so that each may be activated or deactivated to achieve the desired lighting.

The disclosure herein is further summarized in the following paragraphs and is further characterized by combinations of any and all of the various aspects described therein.

According to one aspect of the present disclosure, an illumination system includes an array of light-emitting diodes (LEDs) including a plurality of first light-emitting diodes and a plurality of second light-emitting diodes. A microlens array overlays the plurality of first and second light-emitting diodes and includes a plurality of first lenses corresponding to the plurality of first light-emitting diodes and a plurality of second lenses corresponding to the plurality of second light-emitting diodes. A first geometry of at least one of the plurality of first lenses is different than a second geometry of at least one of the plurality of second lenses. An imaging device is configured to capture an image based on light reflected from a target region from the plurality of first light-emitting diodes. At least one processing device is in communication with the array of light-emitting diodes and the imaging device. The at least one processing device is configured to identify a shadow cast on the target region by an obstruction and selectively activate the plurality of second light-emitting diodes from an unobstructed angle.

According to another aspect, at least one processing device is further configured to determine a plurality of first light-emitting diodes is a cause of a shadow in a target region, deactivate the plurality of first light-emitting diodes to limit the shadow, and activate a plurality of second light-emitting diodes to illuminate the target region.

According to yet another aspect, a microlens array is an integrally formed layer overlaying an array of light-emitting diodes.

According to still yet another aspect, at least one processing device is configured to selectively activate a plurality of second light-emitting diodes to illuminate a target region from an unobstructed angle while an array of light-emitting diodes are statically located.

According to another aspect, an illumination system includes one or more actuators for adjusting a position of at least one of a plurality of first light-emitting diodes or a plurality of second light-emitting diodes.

According to yet another aspect, a plurality of first light-emitting diodes are arranged in a first concentric pattern and a plurality of second light-emitting diodes are arranged in a second concentric pattern.

According to still yet another aspect, a memory contains instructions that, when executed by at least one processing device, causes the at least one processing device to recognize a hand gesture in an image, and selectively illuminate or de-illuminate at least one of a plurality of first light-emitting diodes or a plurality of second light-emitting diodes.

According to another aspect, a memory contains instructions that, when executed by at least one processing device, causes the at least one processing device to recognize a hand gesture in an image, and adjust, via one or more actuators, a position of at least one of a plurality of first light-emitting diodes or a plurality of second light-emitting diodes.

According to yet another aspect, a ceiling light fixture comprises an illumination system.

According to still yet another aspect, an array of light-emitting diodes are located on a mobile boom.

According to another aspect, an array of light-emitting diodes and an imaging device are located on a common structure.

According to yet another aspect, one of a first geometry and a second geometry corresponds to distributing light at a divergence angle and the other of the first geometry and the second geometry corresponds to distributing light at a convergence angle.

According to still yet another aspect, a first geometry corresponds to distributing light at a first divergence angle and a second geometry corresponds to distributing light at a second divergence angle that is different than the first divergence angle.

According to another aspect, a first geometry corresponds to distributing light at a first convergence angle and a second geometry corresponds to distributing light at a second convergence angle that is different than the first convergence angle.

According to another aspect of the present disclosure, an illumination system includes an array of light-emitting diodes (LEDs) including a plurality of first light-emitting diodes and a plurality of second light-emitting diodes. A microlens array overlays the plurality of first and second light-emitting diodes and includes a plurality of first lenses corresponding to the plurality of first light-emitting diodes and a plurality of second lenses corresponding to the plurality of second light-emitting diodes. A first geometry of the plurality of first lenses corresponds to a first illumination angle a second geometry of the plurality of second lenses corresponds to a second illumination angle that is different than the first illumination angle. A control system is in communication with the array of light-emitting diodes and configured to selectively activate the plurality of second light-emitting diodes and the plurality of second light-emitting diodes to illuminate a target region from an unobstructed angle.

According to another aspect, one of a first geometry and a second geometry corresponds to distributing light at a divergence angle and the other of the first geometry and the second geometry corresponds to distributing light at a convergence angle.

According to yet another aspect, a first geometry corresponds to distributing light at a first divergence angle and a second geometry corresponds to distributing light at a second divergence angle that is different than the first divergence angle.

According to still yet another aspect, a first geometry corresponds to distributing light at a first convergence angle and a second geometry corresponds to distributing light at a second convergence angle that is different than the first convergence angle.

According to yet another aspect of the present disclosure, an illumination system includes an array of light-emitting diodes (LEDs) including a plurality of first light-emitting diodes and a plurality of second light-emitting diodes. A microlens array overlays the plurality of first and second light-emitting diodes and includes a plurality of first lenses corresponding to the plurality of first light-emitting diodes and a plurality of second lenses corresponding to the plurality of second light-emitting diodes. A first geometry of the plurality of first lenses corresponds to a first illumination angle a second geometry of the plurality of second lenses corresponds to a second illumination angle that is different than the first illumination angle. A control system is configured to selectively activate the array of light-emitting diodes to obtain at least one of the first illumination angle or the second illumination angle while the array of light-emitting diodes and the microlens array are statically positioned.

According to another aspect, at least one processing device is further configured to determine a presence of an obstruction between a plurality of first light-emitting diodes and a target region, deactivate a plurality of first light-emitting diodes, and activate a plurality of second light-emitting diodes to illuminate a target region.

According to still yet another aspect of the present disclosure, an illumination system for a medical environment is configured to provide dynamic and adaptive adjustment to mitigate poor ergonomic positions, shadow obstruction, and other sub-optimal conditions for target illumination. The lighting system may incorporate an array of LEDs, each having a microlens overlay configured to direct light from the LEDs at a specific angle, focal distance, light distribution, or other illumination property. The LEDs may be individually addressable to allow the desired lighting properties to be achieved. An imaging system may be provided for capturing and processing images of the medical environment in order to detect an undesired position or condition, such as a straining condition of a medical professional and/or a shadow overlaying a patient, tool, operating area, or other target region in the medical environment. In general, the microlens array may allow the illumination system to have a wide variety of lighting modes that may be selectively adjusted via manual input or automatically by a controller for the illumination system.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

The above description is considered that of the illustrated embodiments only. Modifications of the device will occur to those skilled in the art and to those who make or use the device. Therefore, it is understood that the embodiments shown in the drawings and described above are merely for illustrative purposes and not intended to limit the scope of the device, which is defined by the following claims as interpreted according to the principles of patent law, including the Doctrine of Equivalents.

What is claimed is:

1. An illumination system comprising:
   an array of light-emitting diodes including a plurality of first light-emitting diodes and a plurality of second light-emitting diodes;
   a microlens array overlaying the plurality of first and the second light-emitting diodes and including a plurality of first lenses corresponding to the plurality of first light-emitting diodes and a plurality of second lenses corresponding to the plurality of second light-emitting diodes, wherein a first geometry of at least one of the plurality of first lenses defines a first transmission angle that is different than a second transmission angle defined by a second geometry of at least one of the plurality of second lenses;
   an imaging device configured to capture an image based on light reflected from a target region by illumination from the first transmission angle; and
   at least one processing device in communication with the array of light-emitting diodes and the imaging device, wherein the at least one processing device is configured to identify a shadow cast on the target region by an obstruction and selectively activate the plurality of second light-emitting diodes to illuminate the target region from an unobstructed angle corresponding to the second transmission angle.

2. The illumination system of claim 1, wherein the at least one processing device is further configured to:
   determine the plurality of first light-emitting diodes is the cause of the shadow in the target region;
   deactivate the plurality of first light-emitting diodes to limit the shadow; and
   activate the plurality of second light-emitting diodes to illuminate the target region.

3. The illumination system of claim 1, wherein the microlens array is an integrally formed layer having an outer surface with one of a concave shape or a convex shape that overlays the array of light-emitting diodes.

4. The illumination system of claim 1, wherein the at least one processing device is configured to selectively activate the plurality of second light-emitting diodes to illuminate the target region from the unobstructed angle while the array of light-emitting diodes are statically located.

5. The Illumination system of claim 1, further including one or more actuators for adjusting a position of at least one of the plurality of first light-emitting diodes or the plurality of second light-emitting diodes.

6. The Illumination system of claim 1, wherein the plurality of first light-emitting diodes are arranged in a first concentric pattern and the plurality of second light-emitting diodes are arranged in a second concentric pattern.

7. The illumination system of claim 1, further including a memory containing instructions that, when executed by the at least one processing device, causes the at least one processing device to:
   recognize a hand gesture in the image; and
   selectively illuminate or de-illuminate at least one of the plurality of first light-emitting diodes or the plurality of second light-emitting diodes.

8. The illumination system of claim 1, further including a memory containing instructions that, when executed by the at least one processing device, causes the at least one processing device to:
   recognize a hand gesture in the image; and
   adjust, via one or more actuators, a position of at least one of the plurality of first light-emitting diodes or the plurality of second light-emitting diodes.

9. The illumination system of claim 1, wherein the imaging device is located in a device wearable on a user's head.

10. The illumination system of claim 1, wherein the array of light-emitting diodes are located on a mobile boom.

11. The illumination system of claim 1, wherein the array of light-emitting diodes and the imaging device are located on a common structure and each of the light-emitting diodes are spaced by 5 mm or less.

12. The illumination system of claim 1, wherein one of the first geometry and the second geometry corresponds to distributing light at a divergence angle and the other of the first geometry and the second geometry corresponds to distributing light at a convergence angle.

13. The illumination system of claim 1, wherein the first geometry corresponds to distributing light at a first divergence angle and the second geometry corresponds to distributing light at a second divergence angle that is different than the first divergence angle.

14. The illumination system of claim 1, wherein the first geometry corresponds to distributing light at a first convergence angle towards a first focal point and the second geometry corresponds to distributing light at a second convergence angle towards a second focal point that is spaced from and overlapping with the first focal point.

15. An illumination system comprising:
   an array of light-emitting diodes including a plurality of first light-emitting diodes and a plurality of second light-emitting diodes;
   a microlens array overlaying the plurality of first and the second light-emitting diodes and including a plurality of first lenses corresponding to the plurality of first light-emitting diodes and a plurality of second lenses corresponding to the plurality of second light-emitting diodes, wherein a first geometry of the plurality of first lenses corresponds to at least two divergence angles a second geometry of the plurality of second lenses corresponds to at least two convergence angles; and
   a control system in communication with the array of light-emitting diodes, wherein the control system is configured to selectively activate the plurality of first light-emitting diodes and the plurality of second light-emitting diodes to illuminate a target region from an unobstructed angle.

16. The illumination system of claim 15, wherein at least one of the at least two divergence angles intersects at least one of the at least two convergence angles.

17. The illumination system of claim 15, wherein the at least two divergence angles are intersecting.

18. The illumination system of claim 15, wherein at least two convergence angles includes a first convergence angle towards a first region and a second convergence angle towards a second region that is non-overlapping with the first region.

* * * * *